United States Patent [19]
Sasaki

[11] Patent Number: 5,789,988
[45] Date of Patent: Aug. 4, 1998

[54] CLOCK RECOVERY CIRCUIT FOR QAM DEMODULATOR

[75] Inventor: Eisaku Sasaki, Tokyo, Japan

[73] Assignee: NEC Corporation, Tokyo, Japan

[21] Appl. No.: 813,668

[22] Filed: Mar. 7, 1997

[30] Foreign Application Priority Data

Mar. 7, 1996 [JP] Japan .................... 8-049785

[51] Int. Cl.[6] ................ H03D 3/00; H03L 7/085; H04L 27/34; H04L 27/38
[52] U.S. Cl. .............. 331/25; 331/1 A; 329/304; 329/310; 375/261; 375/344; 375/376
[58] Field of Search .............. 331/1 A, 25; 375/261, 375/327, 328, 344, 376; 329/304–310

[56] References Cited

U.S. PATENT DOCUMENTS

| | | | |
|---|---|---|---|
| 5,042,052 | 8/1991 | Roberts et al. | 375/97 |
| 5,608,764 | 3/1997 | Sugita et al. | 375/344 |

FOREIGN PATENT DOCUMENTS 59-161149  9/1984  Japan .

OTHER PUBLICATIONS

S. Otani et al., "Development of a Variable-Rate Digital Modem for Satellite Communication Systems", NEC Res. & Develop., No. 92, pp. 25–31, Jan. 1989.

*Primary Examiner*—David Mis

[57] ABSTRACT

In a clock recovery circuit in a demodulator of a multi-level quadrature amplitude modulation (QAM) system, an analog/digital (A/D) converter performs an A/D conversion upon a coherent-detected baseband analog signal in synchronization with a sampling clock signal having a time period half of a symbol time period. An phase detector receives successive first, second and third sampled data from the A/D converter, determines whether or not a signal transition formed by the first and second sampled data crosses a zero value within a predetermined time deviation, and compares a polarity of the second sampled data with a polarity of one of the first and second sampled data to generate a phase detection signal. Further, a loop filter is connected to an output of the phase detector, and a voltage controlled oscillator supplies the sampling clock signal to the A/D converter in accordance with an output signal of the loop filter.

10 Claims, 13 Drawing Sheets

*Fig. 4* PRIOR ART

| PHASE | SIGNAL TRANSITION | POLARITY OF D₁ | POLARITY OF D₃ | POLARITY OF ERROR OF D₂ | EXCLUSIVE OR |
|---|---|---|---|---|---|
| LEADING | 301 | H | L | H | L |
| | 302 | H | L | H | L |
| | 303 | L | H | L | L |
| | 304 | L | H | L | L |
| LAGGING | 301 | H | L | L | H |
| | 302 | L | L | H | H |
| | 303 | L | H | H | H |
| | 304 | L | H | H | H |

Fig. 7 PRIOR ART

| PHASE | SIGNAL TRANSITION | POLARITY OF D$_1$ | POLARITY OF D$_3$ | POLARITY OF D$_2$ | EXCLUSIVE OR |
|---|---|---|---|---|---|
| LEADING | 601 | H | L | H | L |
| LEADING | 602 | L | H | L | L |
| LAGGING | 601 | H | L | L | H |
| LAGGING | 602 | L | H | H | H |

Fig. 10

| PHASE | SIGNAL TRANSITION | D₁ | D₃ | POLARITY OF D₃ | D₂ | EXCLUSIVE OR |
|---|---|---|---|---|---|---|
| LEADING | 901 | (1,1) | (0,0) | H | H | L |
| | 902 | (1,0) | (0,1) | H | H | L |
| | 903 | (0,1) | (1,0) | L | L | L |
| | 904 | (0,0) | (1,1) | L | L | L |
| LAGGING | 901 | (1,1) | (0,0) | H | L | H |
| | 902 | (1,0) | (0,1) | H | L | H |
| | 903 | (0,1) | (1,0) | L | H | H |
| | 904 | (0,0) | (1,1) | L | H | H |

Fig. 13

| PHASE | SIGNAL TRANSITION | D₁ | D₃ | POLARITY OF D₃ | D₂ | EXCLUSIVE OR |
|---|---|---|---|---|---|---|
| LEADING | 901 | (1,1) | (0,0) | L | H | H |
| | 902 | (1,0) | (0,1) | L | H | H |
| | 903 | (0,1) | (1,0) | H | L | H |
| | 904 | (0,0) | (1,1) | H | L | H |
| LAGGING | 901 | (1,1) | (0,0) | L | L | L |
| | 902 | (0,1) | (0,1) | L | H | L |
| | 903 | (0,1) | (1,0) | H | H | L |
| | 904 | (0,0) | (1,1) | H | H | L |

CLOCK RECOVERY CIRCUIT FOR QAM DEMODULATOR

BACKGROUND OF THE INVENTION

1. Field of the Invention

The present invention relates to a clock recovery circuit for a quadrature amplitude modulation (QAM) demodulator.

2. Description of the Related Art

In a demodulator of a digital microwave communication system, a clock signal is recovered from a received signal, and the received signal is sampled by the recovered clock signal to obtain digital data.

In a first prior art clock recovery circuit, a coherent-detected baseband analog signal is supplied to an analog/digital (A/D) converter and a full-wave rectifier. A clock frequency component of the multi-level QAM received signal is generated in the output signal of the full-wave rectifier. Then, a band-pass filter passes only this clock frequency component therethrough. A phase comparator compares the phase of output signal of the band-pass filter with that of the output signal of a voltage controlled oscillator to transmit a comparison signal to a loop filter. The clock signal of the voltage controlled oscillator is supplied via a phase shifter to the A/D converter as a sampling clock signal having a symbol time period. This will be explained later in detail.

The first prior art clock recovery circuit can be used regardless of the type of modulation system, and therefore, is not subject to thermal noise and distortion.

However, since the first prior art clock recovery circuit is formed by an analog circuit, it is difficult to construct this circuit by an integrated circuit, and also, this circuit is subject to the fluctuation characteristics of the components, the fluctuation of the ambient temperature, and the frequency. In addition, since the A/D converter is not included in a phase-locked loop so that the phase of the baseband analog signal is independent of that of the sampling clock signal, the phase shifter is provided to adjust the latter to the former. Further, such an adjusted phase may be shifted from an optimum phase due to the fluctuation of the ambient temperature.

In a second prior art clock recovery circuit (see: JP-59-161149), a coherent-detected baseband analog signal is supplied to an A/D converter which generates a digital output signal at each symbol time period. The digital output signal is supplied to a loop filter, and the output signal of the loop filter is supplied to a voltage controlled oscillator which generates a sampling clock signal having a certain time period.

The algorithm of the operation of the phase detector is explained below. Assume that three successive sampled digital data at the output of the A/D converter are denoted by $D_1$, $D_2$ and $D_3$. In this case, only if the polarity of the data $D_1$ is different from that of the data $D_3$, is an exclusive OR logic signal between the polarity of the data $D_1$ and the polarity of an error of the data $D_2$ calculated and supplied to the loop filter. The exclusive OR logic signal serves as a phase detection signal for showing whether the sampling timing is leading or a lagging in relation to an optimum phase. This will also be explained later in detail.

In the second prior art clock recovery circuit, since the A/D converter is included in a phase-locked loop, the sampling timing or phase is automatically brought close to the optimum timing or phase. Thus, a phase adjusting means is unnecessary.

In the second prior art clock recovery circuit, however, since a clearly opened eye pattern of a signal transition has to be detected, it is impossible to extract a clock signal if such an eye pattern is not clear due to a fading phenomenon.

In a third prior art clock recovery circuit a coherent-detected baseband analog signal is supplied to an A/D converter which generates a digital output signal at each time period half of symbol time period. The digital output signal is supplied to a loop filter, and the output signal of the loop filter is supplied to a voltage controlled oscillator which generates a sampling clock signal having a time period half of the symbol time period.

The algorithm of the operation of the phase detector is explained below. Assume that three successive sampled digital data at the output of the A/D converter are denoted by $D_1$, $D_2$ and $D_3$. In this case, only if the polarity of the data $D_1$ is different from that of the data $D_3$, is an exclusive OR logic signal between the polarity of the data $D_1$ and the polarity of the data $D_2$ calculated and supplied to the loop filter. The exclusive OR logic signal serves as a phase detection signal for showing whether the sampling timing is leading or a lagging in relation to an optimum phase. This will also be explained later in detail.

Even in the third prior art clock recovery circuit, since the A/D converter is included in a phase-locked loop, the sampling timing or phase is automatically brought close to the optimum timing or phase. Thus, a phase adjusting means is unnecessary. In addition, since a clearly opened eye pattern of a signal transition is unnecessary, it is possible to extract a clock signal if such a eye pattern is not clear due to fading phenomenon.

The third prior art clock recovery circuit, however, can be applied to only a QPSK system. That is, in the QPSK system, since a time period in which an eye pattern of a signal transition crosses OV (zero data) is relatively short, the jitter of a recovered clock signal based on zero-crossing signals can be sufficiently suppressed in the loop filter.

On the other hand, in a multi-level QAM system such as $2^m$ QAM ststem ($m \geq 4$), a time deviation in which an eye pattern of a signal transition crosses OV (zero data) is relatively large. As a result, the jitter of a recovered clock signal based on zero-crossing signals becomes large. Particularly, as the value m becomes larger, the allowable jittering becomes smaller, which deteriorates the error rate characteristics.

SUMMARY OF THE INVENTION

It is an object of the present invention to provide a jitter-suppressed clock recovery circuit for a multi-valued QAM demodulator such as $2^m$ QAM system ($m \geq 4$).

According to the present invention, in a clock recovery circuit in a demodulator of a multi-level QAM system, an A/D converter performs an A/D conversion upon a coherent-detected baseband analog signal in synchronization with a sampling clock signal having a time period that is half of a symbol time period. A phase detector receives successive first, second and third sampled data from the A/D converter, determines whether or not a signal transition formed by the first and second sampled data crosses a zero value within a predetermined time deviation, and compares a polarity of the second sampled data with a polarity of one of the first and second sampled data to generate a phase detection signal. Further, a loop filter is connected to an output of the phase detector, and a voltage controlled oscillator supplies the sampling clock signal to the A/D converter in accordance with an output signal of the loop filter.

3

Thus, if the predetermined time deviation for obtaining phase information is small, the fluctuation of the phase detection signal is reduced.

BRIEF DESCRIPTION OF THE DRAWINGS

The present invention will be more clearly understood form the description as set forth below, as compared with the prior art, with reference to the accompanying drawings, wherein:

FIG. 4 is a table showing the operation of the phase detector of FIG. 2;

FIG. 7 is a table showing the operation of the phase detector of FIG. 5;

FIG. 10 is a table showing the operation of the phase detector of FIG. 8;

FIG. 13 is a table showing the operation of the phase detector of FIG. 12.

DESCRIPTION OF THE PREFERRED EMBODIMENTS

Before the description of the preferred embodiment, prior art clock recovery circuits provided in a demodulator of a digital microwave communication system such as a QAM system will be explained with reference to FIGS. 1, 2, 3, 4, 5, 6 and 7.

Figure 1:
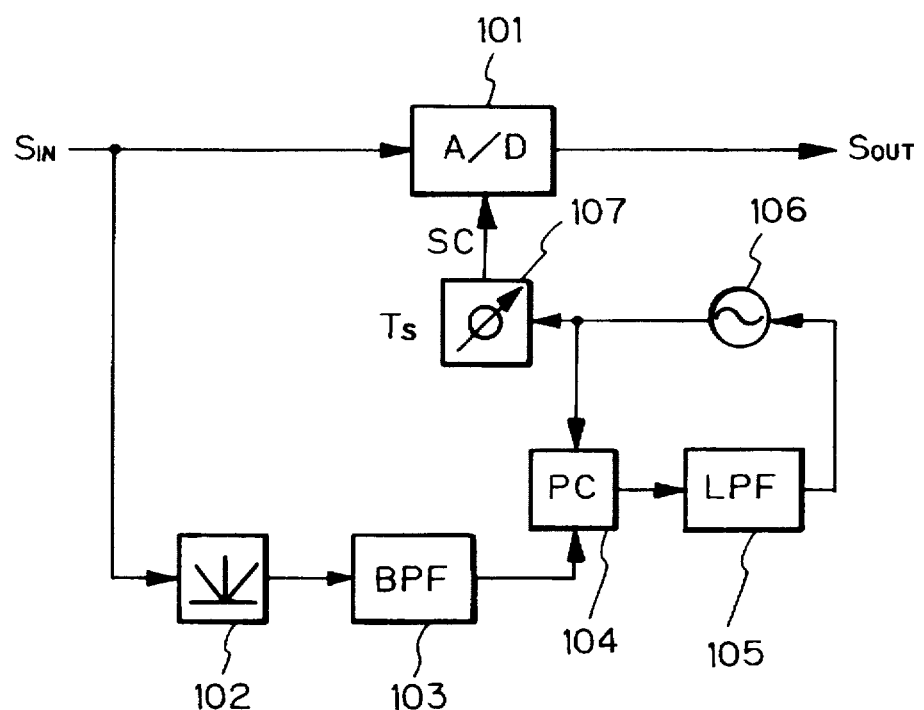
FIG. 1 is a circuit diagram illustrating a first prior art clock recovery circuit.

In FIG. 1, which illustrates a first prior art clock recovery circuit, a coherent-detected baseband analog signal $S_{IN}$ is supplied to an A/D converter 101 and a full-wave rectifier 102. For example, the baseband analog signal $S_{IN}$ is obtained by coherent-detecting of one of an I-channel or a Q-channel of a multi-level QAM received signal.

The time period of the output signal of the full-wave rectifier 102 is the same as a symbol time period $T_S$. As a result, a clock frequency component of the multi-level QAM received signal is generated in the output signal of the full-wave rectifier 102. Then, a band-pass filter 103 passes only this clock frequency component therethrough. A phase comparator 104 compares the phase of the output signal of the band-pass filter 103 with that of the output signal of a voltage controlled oscillator 106 to transmit a comparison signal to a loop filter 101. The clock signal of the voltage controlled oscillator 106 is supplied via a phase shifter 107 to the A/D converter 101 as a sampling clock signal SC having the time period $T_S$, so that the A/D converter 101 generates a digital output signal $S_{OUT}$ at each symbol time

4 period $T_S$. In this case, the phase of this sampling clock signal SC is optimized by the phase shifter 107 to be adjusted to a clock signal of a transmitter (modulator).

The clock recovery circuit of FIG. 1 can be used regardless of the type of modulation system, and therefore, is not subject to thermal noise and distortion.

The clock recovery circuit of FIG. 1, however, is formed by an analog circuit, it is difficult to construct this circuit by an integrated circuit, and also, this circuit is subject to the fluctuation characteristics of the components, as well as the fluctuation of the ambient temperature and the frequency. In addition, since the A/D converter 101 is not included in a phase-locked loop so that the phase of the baseband analog signal $S_{IN}$ is independent of that of the sampling clock signal SC, it is necessary for the phase shifter 107 to adjust the latter to the former. Further, such an adjusted phase may be shifted from an optimum phase due to the fluctuation of the ambient temperature.

Figure 2:
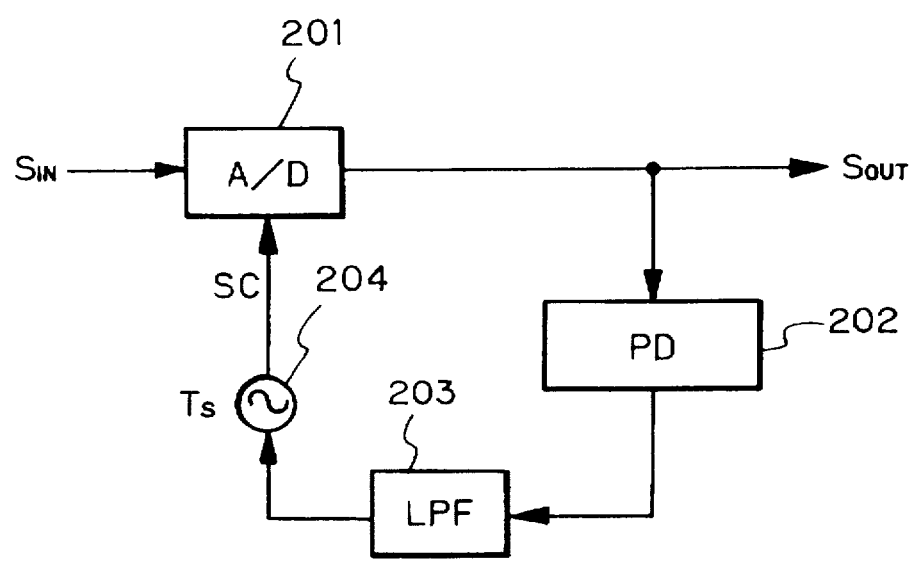
FIG. 2 is a circuit diagram illustrating a second prior art clock recovery circuit.

In FIG. 2, which illustrates a second prior art clock recovery circuit (see: JP-59-161149), a coherent-detected baseband analog signal $S_{IN}$ is supplied to an A/D converter 201 which generates a digital output signal $S_{OUT}$ at each symbol time period $T_S$. The digital output signal $S_{OUT}$ is supplied to a loop filter 203, and the output signal of the loop filter 203 is supplied to a voltage controlled oscillator 204 which generates a sampling clock signal SC having the time period $T_S$.

The algorithm of the operation of the phase detector 202 is as follows. Assume that three successive sampled digital data at the output of the A/D converter 201 are denoted by $D_1$, $D_2$ and $D_3$. In this case, only if the polarity of the data $D_1$ is different from that of the data $D_3$, is an exclusive OR logic signal PD between the polarity of the data $D_1$ and the polarity of an error of the data $D_2$ calculated and supplied to the loop filter 203. Note that the polarity of the error of the data will be explained later. The exclusive OR logic signal PD serves as a phase detection signal for showing whether the sampling timing is leading or lagging in relation to an optimum phase.

The phase detection circuit 202 of FIG. 2 is explained next in more detail with reference to FIGS. 3 and 4. Here, assume that the clock recovery circuit of FIG. 2 is applied to a QPSK demodulator.

Figure 3:
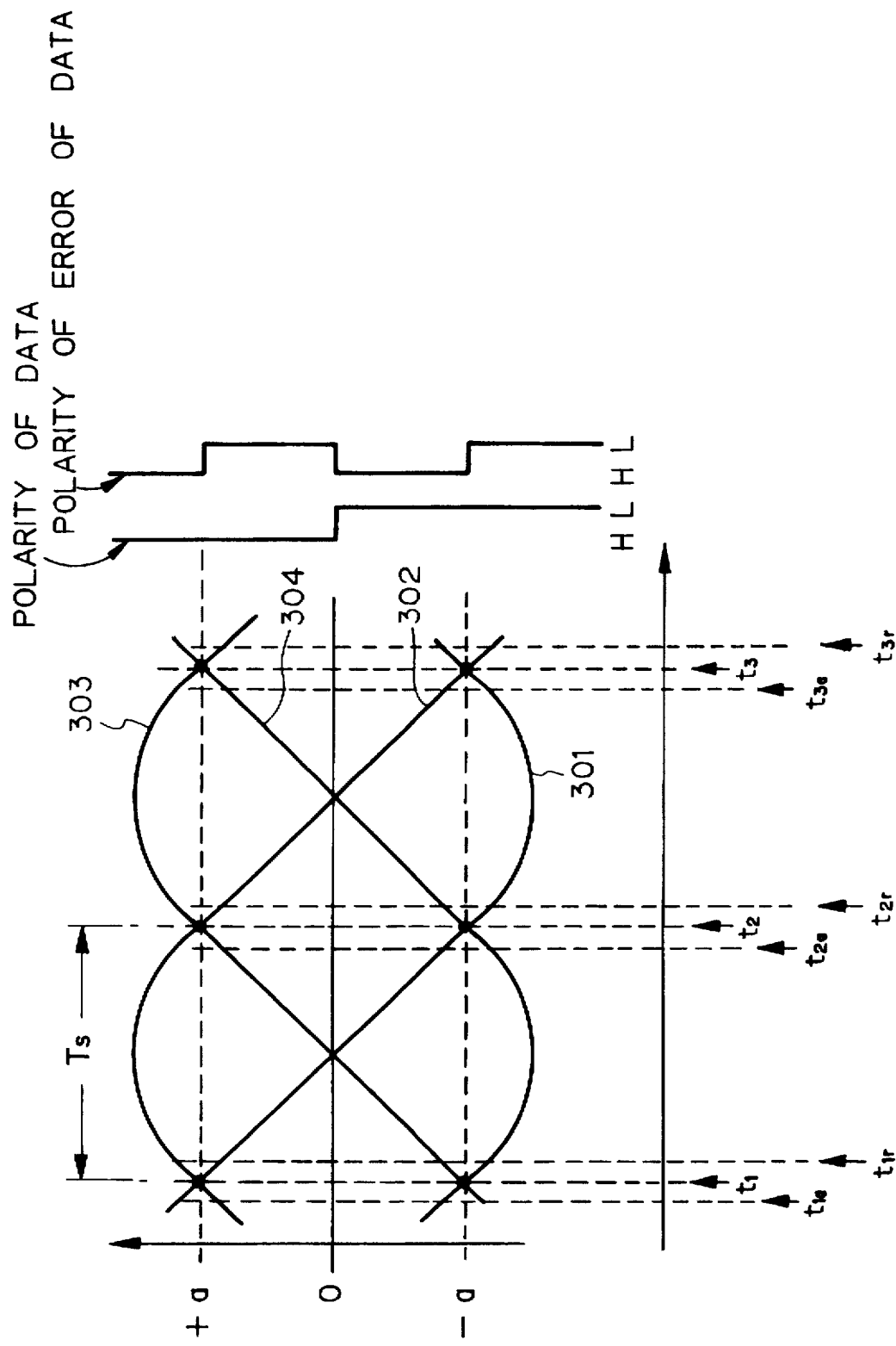
FIG. 3 is a timing diagram for showing the operation of the circuit of FIG. 2.

In FIG. 3, which is timing diagram showing transitions of a signal at the input of the A/D converter 201, an abscissa designates a time and an ordinate designates an amplitude (voltage). The polarity of the signal or the polarity of the data is determined by whether the voltage of the signal, i.e., the data is positive or negative. Also, the polarity of an error signal of the signal or the polarity of error of the data is determined by comparing the voltage of the signal (or the data) with 0V, +a and −a.

Also, in FIG. 3, $t_1$, $t_2$, $t_3$, $t_{1a}$, $t_{2a}$, $t_{3a}$, $t_{1r}$, $t_{2r}$ and $t_{3r}$ denote sampling timings for the A/D converter 201. Here, the sampling timings $t_1$, $t_2$ and $t_3$ are optimum timings, the sampling timings $t_{1a}$, $t_{2a}$ and $t_{3a}$ are leading timings, and the sampling timings $t_{1r}$, $t_{2r}$ and $t_{3r}$ are lagging timings. Only signal transitions 301, 302, 303 and 304 satisfy the condition that the polarity of the data $D_1$ sampled at a first timing $t_1$, $t_{1a}$ or $t_{1r}$ is different from the polarity of the data $D_3$ sampled at a third timing $t_3$, $t_{3a}$ or $t_{3r}$.

If the input signal of the A/D converter 201 is sampled at the optimum timings $t_1$, $t_2$ and $t_3$, the mark ratio of "H" to "L" in the polarity of an error of data is 1.

As shown in FIG. 4, if the input signal of the A/D converter 201 is sampled at the leading timings $t_{1a}$, $t_{2a}$ and $t_{3a}$, the polarity of an error of the data $D_2$ at the second timing $t_{2a}$ is the same as the polarity of the data $D_1$ at the first timing $t_{1a}$ for all the signal transitions 301, 302, 303 and 304. As a result, an exclusive OR logic between the polarity of the data $D_1$ and the polarity of error of the data $D_2$ is "L" for all the signal transitions 301, 302, 303 and 304.

Also, as shown in FIG. 4, if the input signal of the A/D converter 201 is sampled at the lagging timings $t_{1r}$, $t_{2r}$ and $t_{3r}$, the polarity of an error of the data $D_2$ at the second timing $t_{2a}$ is opposite to the polarity of the data $D_1$ at the first timing $t_{1a}$ for all the signal transitions 301, 302, 303 and 304. As a result, an exclusive OR logic between the polarity of the data $D_1$ and the polarity of an error of the data $D_2$ is "H" for all the signal transitions 301, 302, 303 and 304.

Thus, the above-mentioned exclusive OR logic represents phase information of the sampling clock signal SC, and therefore, this phase information is supplied to the loop filter 203, thus creating an automatic phase control (APC) voltage for the voltage controlled oscillator 204.

In the clock recovery circuit of FIG. 2, since the A/D converter 201 is included in a phase-locked loop, the sampling timing or phase is automatically brought close to the optimum timing or phase. Thus, the phase shifter 107 of FIG. 1 as a phase adjusting means is unnecessary.

In the clock recovery circuit of FIG. 2, however, since a clearly opened eye pattern of a signal transition is detected, it is impossible to extract a clock signal if such an eye pattern is not clear due to fading phenomenon. Generally, in a digital microwave communication system, an equalizer is provided as a countermeasure for intersymbol interference caused by a fading phenomenon, so that an eye pattern at the output of the equalizer is clear. However, even in this case, if a clock signal is not recovered, the equalizer never exhibits its ability.

Figure 5:
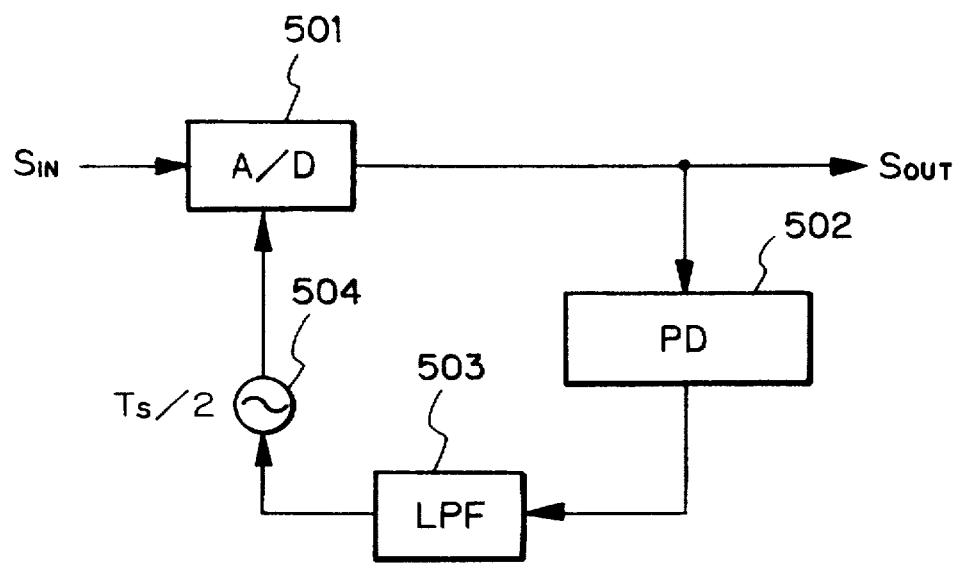
FIG. 5 is a circuit diagram illustrating a third prior art clock recovery circuit.

In FIG. 5, which illustrates a third prior art clock recovery circuit, a coherent-detected baseband analog signal $S_{IN}$ is supplied to an A/D converter 501 which generates a digital output signal $S_{OUT}$ at each time period half of the symbol time period $T_S$. The digital output signal $S_{OUT}$ is supplied to a loop filter 503, and the output signal of the loop filter 503 is supplied to a voltage controlled oscillator 504 which generates a sampling clock signal SC having a time period $T_S/2$.

The algorithm of the operation of the phase detector 502 is as follows. Assume that three successive sampled digital data at the output of the A/D converter 501 are denoted by $D_1$, $D_2$ and $D_3$. In this case, only if the polarity of the data $D_1$ is different from that of the data $D_3$, is an exclusive OR logic signal PD between the polarity of the data $D_1$ and the polarity of the data $D_2$ calculated and supplied to the loop filter 503. The exclusive OR logic signal PD serves as a phase detection signal for showing whether the sampling timing is leading or lagging in relation to an optimum phase.

The phase detection circuit 502 of FIG. 5 is explained next in more detail with reference to FIGS. 6 and 7. Here, assume that the clock recovery circuit of FIG. 5 is also applied to a QPSK demodulator.

Figure 6:
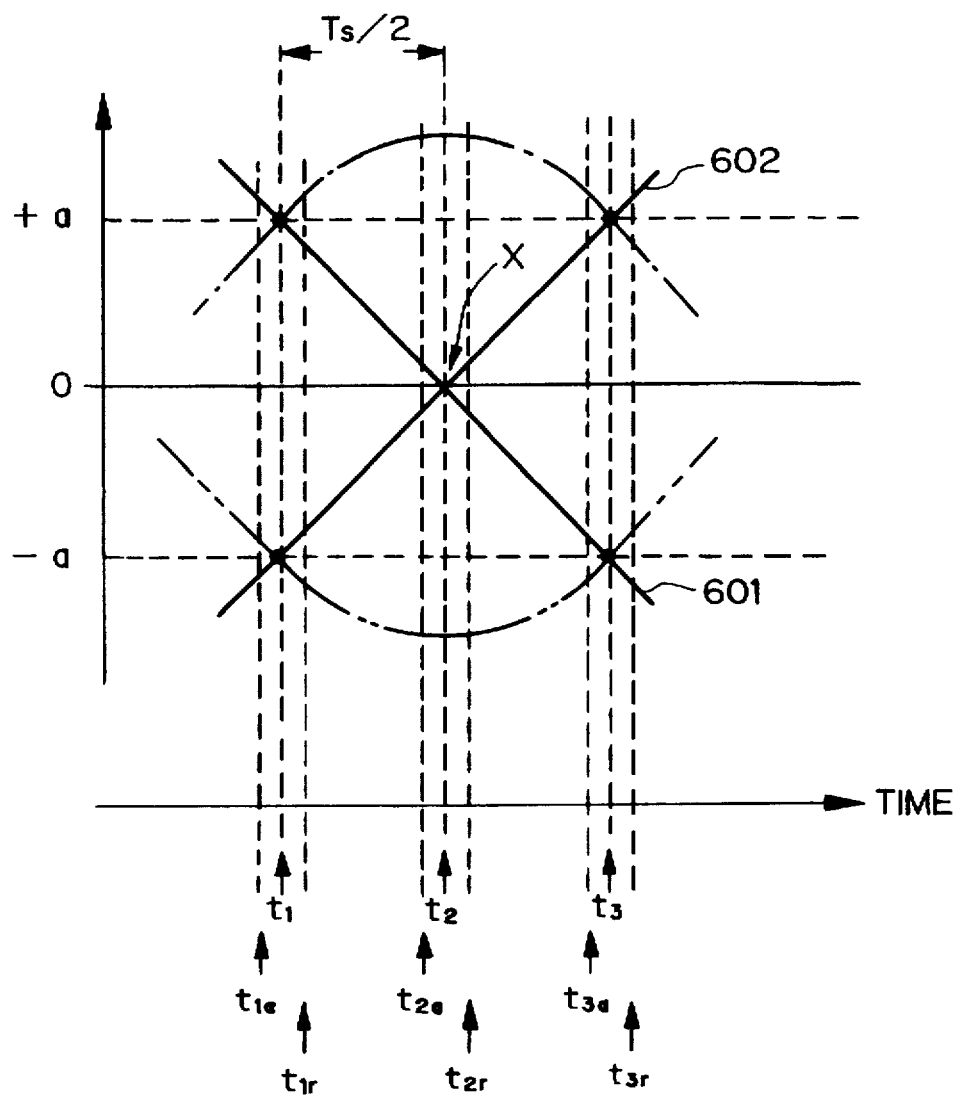
FIG. 6 is a timing diagram for showing the operation of the circuit of FIG. 5.

In FIG. 6, which is timing diagram showing transitions of a signal at the input of the A/D converter 501, an abscissa designates a time and an ordinates an amplitude (voltage). The polarity of the signal or the polarity of the data is determined by whether the voltage of the signal, i.e., the data is positive or negative.

Also, in FIG. 6, $t_1$, $t_2$, $t_3$, $t_{1a}$, $t_{2a}$, $t_{3a}$, $t_{1r}$, $t_{2r}$ and $t_{3r}$ denote sampling timings for the A/D converter 501. Here, the sampling timings $t_1$, $t_2$ and $t_3$ are optimum timings, the sampling timings $t_{1a}$, $t_{2a}$ and $t_{3a}$ are leading, and the sampling timings $t_{1r}$, $t_{2r}$ and $t_{3r}$ are lagging. Only signal transitions 601 and 602 satisfy the condition that the polarity of the data $D_1$ sampled at a first timing $t_1$, $t_{1a}$ or $t_{1r}$ is different from the polarity of the data $D_3$ sampled at a third timing $t_3$, $t_{3a}$ or $t_{3r}$.

If the input signal of the A/D converter 501 is sampled at the optimum timings $t_1$, $t_2$ and $t_3$, the mark ratio of "H" to "L" in the polarity of an error of data is 1.

As shown in FIG. 7, if the input signal of the A/D converter 501 is sampled at the leading timings $t_{1a}$, $t_{2a}$ and $t_{3a}$, the polarity of the data $D_2$ at the second timing $t_{2a}$ is the same as the polarity of the data $D_1$ at the first timing $t_{1a}$ for both of the signal transitions 601 and 602. As a result, an exclusive OR logic between the polarity of the data $D_1$ and the polarity of the data $D_2$ is "L" for both of the signal transitions 601 and 602.

Also, as shown in FIG. 7, if the input signal of the A/D converter 501 is sampled at the lagging timings $t_{1r}$, $t_{2r}$ and $t_{3r}$, the polarity of the data $D_2$ at the second timing $t_{2a}$ is opposite to the polarity of the data $D_1$ at the first timing $t_{1a}$ for both of the signal transitions 601 and 602. As a result, an exclusive OR logic between the polarity of the data $D_1$ and the polarity of the data $D_2$ is "H" for both of the signal transitions 601 and 602.

Thus, the above-mentioned exclusive OR logic represents phase information of the sampling clock signal SC, and therefore, this phase information is supplied to the loop filter 503, thus creating an APC voltage for the voltage controlled oscillator 504.

Even in the clock recovery circuit of FIG. 5, since the A/D converter 501 is included in a phase-locked loop, the sampling timing or phase is automatically brought close to the optimum timing or phase. Thus, the phase shifter 107 of FIG. 1 as a phase adjusting means is unnecessary. In addition, since a clearly opened eye pattern of a signal transition is unnecessary, it is possible to extract a zero crossing timing if such an eye pattern is not clear caused by a fading phenomenon.

The clock recovery circuit of FIG. 5, however, can be applied to only a QPSK system. That is, in the QPSK system, since a time deviation in which an eye pattern of a signal transition crosses 0V (zero data) as indicated by X in FIG. 6 is relatively short, the jitter of a recovered clock signal based on zero-crossing signals can be sufficiently suppressed in the loop filter 503.

On the other hand, in a multi-level QAM system such as a $2^m$ QAM ststem ($m \geq 4$), an amplitude of an eye pattern of a signal transition is may be small so that a time duration in which an eye pattern of a signal transition crosses 0V (zero data) is relatively large. As a result, the jitter of a recovered clock signal based on zero-crossing signals becomes large. Particularly, as the value m becomes larger, the allowable jittering becomes smaller, which deteriorates the error rate characteristics. Note that, if the bandwidth of the loop filter 503 is made narrow, the jitter can be suppressed. Also, the capture range of the phase-locked loop is narrowed.

Figure 8:
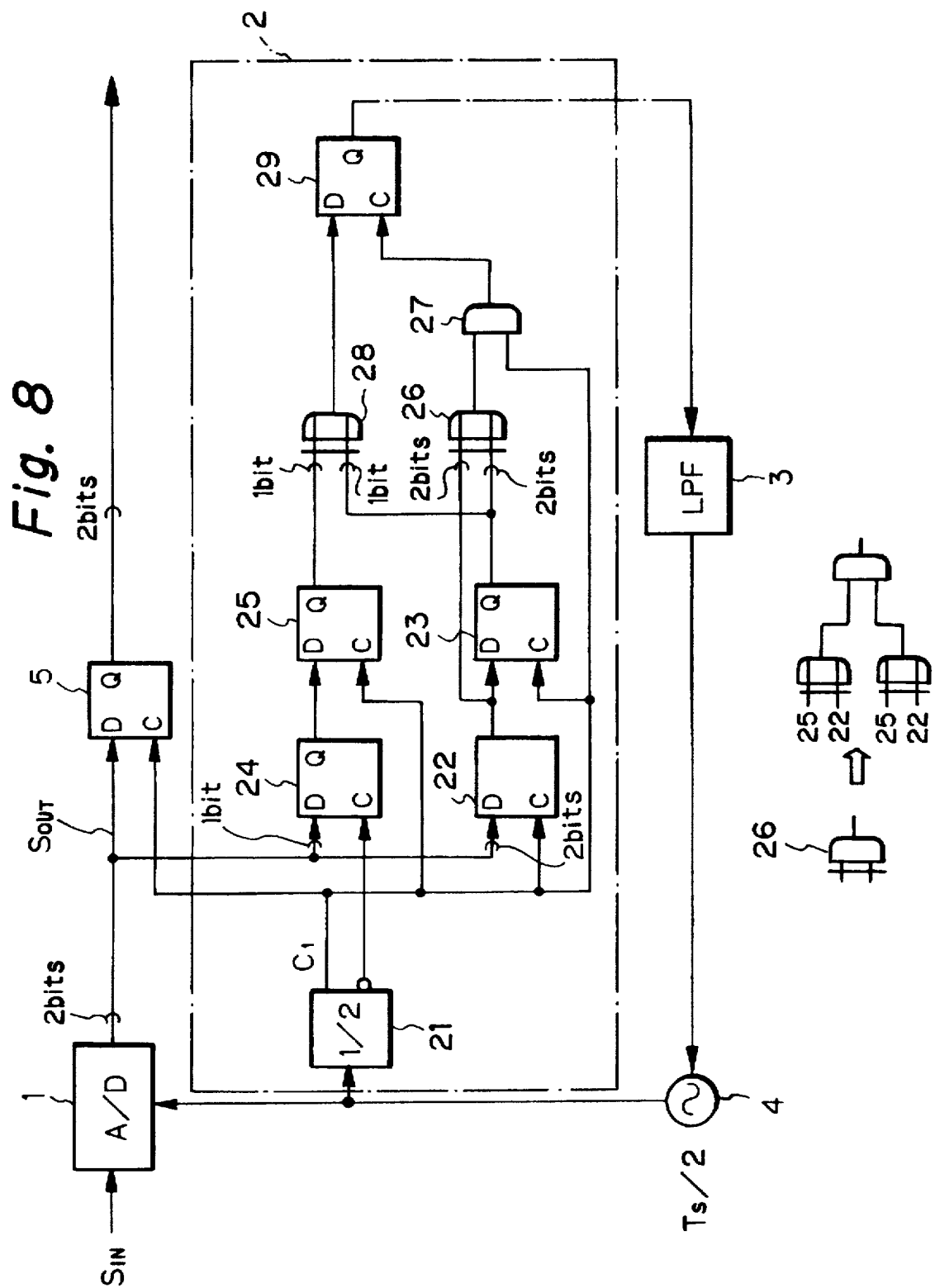
FIG. 8 is a circuit diagram illustrating an embodiment of the clock recovery circuit according to the present invention.

In FIG. 8, which illustrates an embodiment of the present invention, a 16 QAM signal becomes a baseband analog signal for a pair of orthogonally arranged channels. Since the two channels are equiralent and information on the phase of a clock signal can be obtained from either one of the two channels, the operation of only one of the channels will be described here.

In FIG. 8, a coherent-detected baseband analog signal $S_{IN}$ is supplied to an A/D converter 1 which generates a digital output signal $S_{OUT}$ at each time period half of the symbol time period $T_S$. The digital output signal $S_{OUT}$ is supplied to a loop filter 3, and the output signal of the loop filter 3 is supplied to a voltage controlled oscillator 4 which generates a sampling clock signal SC having a time period $T_S/2$.

The algorithm of the operation of the phase detector 502 is as follows. Assume that three successive sampled digital data at the output of the A/D converter 1 are denoted by $D_1$, $D_2$ and $D_3$. In this case, only if the data $D_1$ has an inverted relationship to the data $D_3$, is an exclusive OR logic signal PD between the polarity of the data $D_1$ and the polarity of the data $D_2$ calculated and supplied to the loop filter 3. The exclusive OR logic signal PD serves as a phase detection signal for showing whether the sampling timing is leading or lagging with an optimum phase.

The phase detection circuit 2 of FIG. 8 is explained next in more detail with reference to FIGS. 9 and 10. Here, assume that the clock recovery circuit of FIG. 8 is applied to a 16-valued QAM demodulator.

Figure 9:
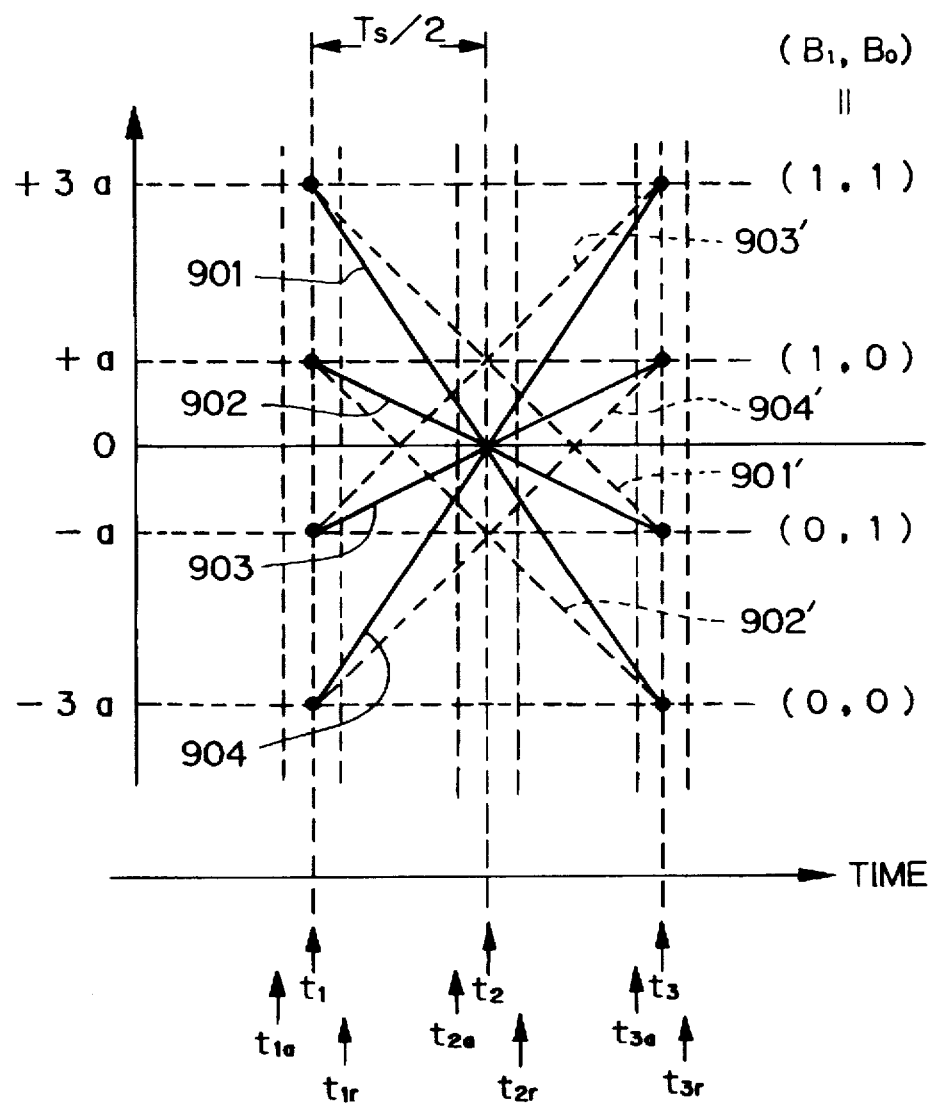
FIG. 9 is a timing diagram for showing the operation of the circuit of FIG. 8.

In FIG. 9, which is timing diagram showing transitions of a signal at the input of the A/D converter 1, an abscissa designates a time and an ordinate designates an amplitude (voltage). The polarity of the signal or the polarity of the data is determined by whether the voltage of the signal, i.e., one bit $B_1$ of the data is "0" or "1".

Also, in FIG. 9, $t_1$, $t_2$, $t_3$, $t_{1a}$, $t_{2a}$, $t_{3a}$, $t_{1r}$, $t_{2r}$, and $t_{3r}$ denote sampling timings for the A/D converter 1. Here, the sampling timings $t_1$, $t_2$ and $t_3$ are optimum timings, the sampling timings $t_{1a}$, $t_{2a}$ and $t_{3a}$ are leading timings, and the sampling timings $t_{1r}$, $t_{2r}$ and $t_{3r}$ are lagging timings. At every symbol time period $T_S$, the eye pattern of the signal transitions is converged into four points defined by voltages $-3a$, $-a$, $+a$ and $+3a$ which correspond to data $(0, 0)$, $(0, 1)$, $(1, 0)$ and $(1, 1)$, respectively. In this case, there are 16 possible signal transitions from time $t_1$ ($t_{1a}$, $t_{1r}$) to time $t_2$ ($t_{2a}$, $t_{2r}$). Among the 16 signal transitions, the eight signal transitions 901, 901', 902, 902' 903, 903', 904 and 904' cross 0V (center voltage). If the signal transitions 901, 901', 902, 902' 903, 903', 904 and 904' are linearly changed, only the four transitions 901, 902, 903 and 904 cross 0V nearly at a time such as $t_2$ ($t_{2a}$, $t_{2r}$). Note that the signal transitions 901, 902, 903 and 904 are not precisely straight, due to the band limitation caused by the cosine roll-off characteristics.

In the embodiment, only the four signal transitions 901, 902, 903 and 904 are extracted from all the 16 possible signal transitions, to form a phase detection signal PD. Since the time deviation for obtaining phase information by timing $t_2$ ($t_{2a}$, $t_{2r}$) is very small, the fluctuation of the phase detection signal PD can be remarkably reduced. Thus, a jitter-suppressed clock signal can be obtained without narrowing the bandwidth of the loop filter 3.

The signal transitions 901, 902, 903 and 904 satisfy the condition that the data $D_1$ sampled at a first timing $t_1$, $t_{1a}$ or $t_{1r}$ has a reverse relationship to the data $D_3$ sampled at a third timing $t_3$, $t_{3a}$ or $t_{3r}$. For example, when $D_1=(1, 1)$, $D_3=(0, 0)$, as shown in FIG. 10.

If the input signal of the A/D converter 1 is sampled at the optimum timings $t_1$, $t_2$ and $t_3$, the mark ratio of "H" to "L" in the polarity of an error of data is 1.

As shown in FIG. 10, if the input signal of the A/D converter 1 is sampled at the leading timings $t_{1a}$, $t_{2a}$ and $t_{3a}$, the polarity of the data $D_2$ at the second timing $t_{2a}$ is the same as the polarity of the data $D_1$ at the first timing $t_{1a}$ for all the signal transitions 901, 902, 903 and 904. As a result, an exclusive OR logic between the polarity of the data $D_1$ and the polarity of the data $D_2$ is "L" for all the signal transitions 901, 902, 903 and 904.

Also, as shown in FIG. 10, if the input signal of the A/D converter 1 is sampled at the lagging timings $t_{1r}$, $t_{2r}$ and $t_{3r}$, the polarity of the data $D_2$ at the second timing $t_{2r}$ is opposite to the polarity of the data $D_1$ at the first timing $t_{1a}$ for all the signal transitions 901, 902, 903 and 904. As a result, an exclusive OR logic between the polarity of the data $D_1$ and the polarity of the data $D_2$ is "H" for all the signal transitions 901, 902, 903 and 904.

Thus, the above-mentioned exclusive OR logic represents phase information of the sampling clock signal SC, and therefore, this phase information is supplied to the loop filter 3 thus creating an APC voltage for the voltage controlled oscillator 4.

The configuration of the phase detector 2 of FIG. 8 is explained next with reference to FIGS. 11A through 11K.

Figure 11:
FIGS. 11A through 11K are timing diagrams for showing the operation of the circuit of FIG. 8.

A ½ frequency divider 21 receives the sampling clock signal SC as shown in FIG. 11A outputted from the voltage controlled oscillator 4 to generate a positive-phase clock signal $C_1$ and a negative-phase clock signal $C_2$ as shown in FIGS. 11B and 11C. The clock signals $C_1$ and $C_2$ have a time period $T_S$.

Two flip-flops 22 and 23 and two flip-flops 24 and 25 form shift registers for delaying the output signal $S_{OUT}$ of the A/D converter 1. Note that each of the flip-flops 22 and 23 is actually two flip-flips; however, only one flip-flop is illustrated to simplify the description. The flip-flops 22, 23 and 25 are operated by the clock signal $C_1$ and the flip-flop 24 is operated by the clock signal $C_2$. As a result, the output signals of the flip-flops 22, 23, 24 and 25 are changed as shown in FIGS. 11D, 11E, 11F and 11G, respectively. Note that the outputs of the flip-flops 23, 25 and 22 correspond to first sampling data, second sampling data and third sampling data, respectively.

An exclusive OR circuit 26 compares the output of the flip-flop 22 with that of the flip-flop 23. In this case, note that the exclusive OR circuit 26 has two exclusive OR circuits and an AND circuit connected to the two exclusive OR circuits as illustrated in FIG. 8. Only when two bits of the first sampled data $D_1$ are opposite to two bits of the third sampled data $D_3$, is the output signal of the exclusive OR circuit 26 "H". Otherwise, the output of the exclusive OR circuit 26 is "L".

As shown in FIG. 11H, the output signal of the exclusive OR circuit 28 is changed at every time period $T_S$. Here, assume that the output signal of the exclusive OR circuit 26 is changed as shown in FIG. 11I. The output signal of the exclusive OR circuit 26 is made effective by an AND circuit 27.

An exclusive OR circuit 28 compares the polarity of the output of the flip-flop 23 with that of the flip-flop 25. That is, the polarity of the first data $D_1$ is compared with that of the second data $D_2$ by comparing one bit of the first data $D_1$ with one bit of the second data $D_2$. When the polarity of the first data $D_1$ is the same as that of the second data $D_2$, the output signal of the exclusive OR circuit 28 is "L". On the other hand, when the polarity of the first data $D_1$ is different from that of the second data $D_2$, the output signal of the exclusive OR circuit 28 is "H". The output signal of the exclusive OR circuit 28 is shown in FIG. 11H.

As shown in FIGS. 11I, 11J and 11K, the output signal of the exclusive OR circuit 28 is latched in a flip-flop 29 in synchronization with the output signal of the AND circuit 27.

Since the output signal $S_{OUT}$ of the A/D converter 1 is generated at a time period $T_S/2$, the output signal $S_{OUT}$ of the A/D converter 1 has to be demultiplied. For realizing this, a flip-flop 5 is provided. The flip-flop 5 is clocked by the clock signal $C_1$ for operating the flip-flops 22, 23 and 25, since the output signal of the flip-flop 23 corresponds to a zero cross point of FIG. 9. Also, in this case, note that although the flip-flop 5 is formed by two flip-flops, only one flip-flop is illustrated to simplify the description.

Figure 12:
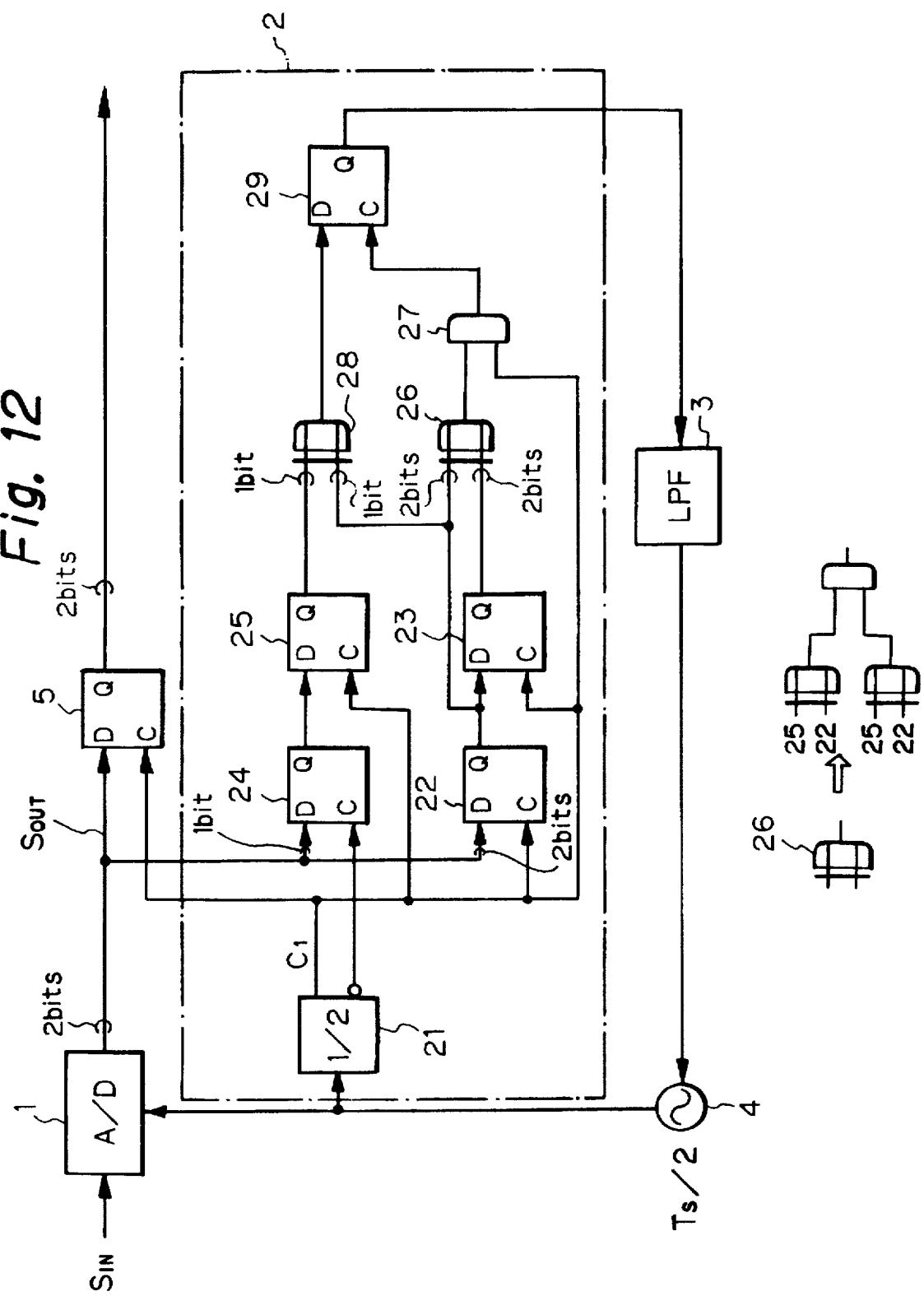
FIG. 12 is a circuit diagram illustrating a modification of the circuit of FIG. 8.

In the above-described embodiment, the exclusive OR circuit 28 is connected to the flip-flops 23 and 25 for receiving the second sampled data $D_2$ and the first sampled data $D_1$. However, the exclusive OR circuit 28 can be connected to the outputs of the flip-flops 22 and 25, as illustrated in FIG. 12. In this case, as shown in FIG. 13, the high and low levels the exclusive OR logic of the exclusive OR circuit 28 represent a leading phase and a lagging phase, respectively.

The present invention can be applied to a 64(=$2^6$)-level QAM system a 256(=$2^8$)-level QAM system and the like. In this case, the exclusive OR circuit 27 of FIGS. 8 and 12 receives two upper bits of the outputs of the flip-flops 22 and 23, if the output signal of the A/D converter 1 is represented by a natural binavy code.

In a 32(=$2^5$)-level QAM system, a 128(=$2^7$)-level QAM system and the like, a signal point arrangement is rectangular, not square; however, one dimensional eye pattern is the same as that of the 64-level QAM and the like. Therefore, the present invention can be applied to the 32-level QAM system, the 128-level QAM system and the like.

As explained hereinabove, according to the present invention, in a higher-level QAM system such as a 16-level QAM system, a 32-level QAM system and the like, since the time period for obtaining phase information is very short, the fluctuation of a phase detection signal can be remarkably reduced. As a result, a jitter-suppressed clock signal can be obtained without reducing the bandwidth of the loop filter.

I claim:

1. A clock recovery circuit in a demodulator of a multi-level quadrature amplitude modulation (QAM) system, comprising:

an analog/digital (A/D) converter for performing an A/D conversion upon a coherent-detected baseband analog signal in synchronization with a sampling clock signal having a time period that is one half of a symbol time period;

a phase detector, connected to an output of said A/D converter, for receiving successive first, second and third sampled data from said A/D converter, determining whether or not a signal transition formed by said first and second sampled data crosses a zero value within a predetermined time deviation, and comparing a polarity of said second sampled data with a polarity of one of said first and second sampled data to generate a phase detection signal;

a loop filter connected to an output of said phase detector; and a voltage controlled oscillator, connected between said loop filter and said A/D converter, for supplying said sampling clock signal to said A/D converter in accordance with an output signal of said loop filter.

2. The circuit as set forth in claim 1, wherein said signal transition is symmetrical with respect to said first and second sampled data.

3. The circuit as set forth in claim 2, wherein said QAM system is a $2^m$ QAM system where m=4, 5, 6, . . . , said signal transition having $2^{m/2}$ patterns.

4. The circuit as set forth in claim 1, wherein said phase detector comprises:

shift registers for shifting a sampled data from said A/D converter in synchronization with said sampling clock signal to generate said first, second and third sampled data;

a first comparator, connected to said shift registers, for comparing two upper bits of said first sampled data with two upper bits of said third sampled data;

a second comparator, connected to said shift registers, for comparing a polarity bit of said second sampled data with a polarity bit of one of said first and third sampled data; and a register, connected to said first and second comparators, for storing an output signal of said second comparator in synchronization with an output signal of said first comparator.

5. A clock recovery circuit in a demodulator of a multi-level quadrature amplitude modulation (QAM) system, comprising:

an analog/digital (A/D) converter for performing an A/D conversion upon a coherent-detected baseband analog signal in synchronization with a sampling clock signal having a time period that is one half of a symbol time period;

a phase detector, connected to an output of said A/D converter, for receiving successive first, second and third sampled data from said A/D converter to generate a phase detection signal;

a loop filter connected to an output of said phase detector; and a voltage controlled oscillator, connected between said loop filter and said A/D converter, for supplying said sampling clock signal to said A/D converter in accordance with an output signal of said loop filter.

said phase detector comprising:

shift registers for shifting a sampled data from said A/D converter in synchronization with said sampling clock signal to generate said first, second and third sampled data;

a first comparator, connected to said shift registers, for comparing two upper bits of said first sampled data with two upper bits of said third sampled data;

a second comparator, connected to said shift registers, for comparing a polarity bit of said second sampled data with a polarity bit of one of said first and third sampled data; and a register, connected to said first and second comparators, for storing an output signal of said second comparator when the two upper bits of said first sampled data are opposite to the two upper bits of said third sampled data, said registor generating said phase detection signal.

6. A multi-level quaradrature amplitude modulation type clock recovery circuit for demodulation, comprising:

an analog/digital (A/D) converter for sampling a baseband analog signal of one of a pair of orthogonally arranged channels detected for synchronism by means of a sampling clock signal at a rate that is twice much as a symbol rate to convert said analog signal into a digital signal;

a phase detector, connected to an output of said A/D converter, for generating first, second and third sample data obtained by delaying an output signal of said A/D converter for each sampling clock signal and outputting phase information on coincidence and non-coincidence of the polarities of said second sample data and one of said first and third sample data on the basis of zero-crossing information for an eye pattern of each signal transition;

a loop filter, connected to said phase detector, for inputting an output signal of said phase detector and suppressing a noise component thereof; and a voltage-controlled oscillator, connected to said loop filter, for outputting said sampling clock of said A/D converter using an output signal of said loop filter as a control signal.

7. A clock recovery circuit as set forth in claim 6, wherein said first, second and third sample data are outputs of shift registers for delaying the output signal of said A/D converter cumulatively by said sampling clock signal, said first through third sample data being arranged in the ascending order of delay time.

8. A clock synchronous circuit as set forth in claim 6, wherein said zero-crossing information on the eye pattern is obtained on the basis that said signal transitions are arranged symmetrically relative to a zero point that is an center of a predetermined number of eye patterns.

9. A clock recovery circuit as set forth in claim 8, wherein said predetermined number is $2^{m/2}$ for demodulating multi-level data having $2^m$ values, m being an integer not smaller than 4.

10. A clock recovery circuit as set forth claim 6, wherein detection of said zero-crossing information is achieved by detecting an inversion of two upper bits of the output signal of said A/D converter where the output signal of said A/D converter is expressed by a natural binary code.

* * * * *